United States Patent
Bennington et al.

(10) Patent No.: US 12,282,120 B2
(45) Date of Patent: Apr. 22, 2025

(54) SYSTEMS AND METHODS FOR INTRA-SHOT DYNAMIC ADJUSTMENT OF LIDAR DETECTOR GAIN

(71) Applicant: LG INNOTEK CO., LTD., Seoul (KR)

(72) Inventors: Dane P. Bennington, Pittsburgh, PA (US); Ryan T. Davis, Woodside, CA (US); Michel H. J. Laverne, Pittsburgh, PA (US)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/211,901

(22) Filed: Jun. 20, 2023

(65) Prior Publication Data

US 2023/0341531 A1    Oct. 26, 2023

Related U.S. Application Data

(63) Continuation of application No. 17/000,265, filed on Aug. 21, 2020, now Pat. No. 11,719,792.

(51) Int. Cl.
*G01S 7/4912* (2020.01)
*G01S 17/14* (2020.01)
*G01S 17/89* (2020.01)

(52) U.S. Cl.
CPC ............ *G01S 7/4918* (2013.01); *G01S 17/14* (2020.01); *G01S 17/89* (2013.01)

(58) Field of Classification Search
None
See application file for complete search history.

(56) References Cited

U.S. PATENT DOCUMENTS

| 7,956,988 | B1 | 6/2011 | Moran |
| 8,976,340 | B2 | 3/2015 | Gilliland et al. |
| 9,304,203 | B1 | 4/2016 | Droz et al. |
| 9,933,513 | B2 | 4/2018 | Dussan et al. |

(Continued)

FOREIGN PATENT DOCUMENTS

| CN | 104777471 A | 7/2015 |
| DE | 10 2016 124 197 A1 | 6/2018 |
| JP | 6454773 B2 | 1/2019 |

OTHER PUBLICATIONS

Busck et al. "Gated Viewing and High-Accuracy Three-Dimensional Laser Radar", Applied Optics, 2004, pp. 4705-4710, vol. 43, issue 24, OSA Publishing.

(Continued)

*Primary Examiner* — Eric L Bolda
(74) *Attorney, Agent, or Firm* — Birch, Stewart, Kolasch & Birch, LLP (57) ABSTRACT

A method including emitting, by an emitting device of an optical ranging system at a first time, a first light pulse; increasing, after the first time, a sensitivity of a photodetector of the optical ranging system from a first sensitivity at a second time to a second sensitivity at a third time; decreasing, after the third time, the sensitivity of the photodetector of the optical ranging system from the second sensitivity to the first sensitivity at a fourth time, wherein the fourth time is after the photodetector receives a return light based on the first light pulse; and emitting, by the optical ranging system at a fifth time after the fourth time, a second light pulse.

8 Claims, 6 Drawing Sheets

(56) References Cited

U.S. PATENT DOCUMENTS

| | | |
|---|---|---|
| 10,114,111 B2 | 10/2018 | Russell et al. |
| 10,139,478 B2 | 11/2018 | Gaalema et al. |
| 10,254,388 B2 | 4/2019 | LaChapelle et al. |
| 10,502,815 B2 | 12/2019 | Smits |
| 10,539,663 B2 | 1/2020 | Zhan et al. |
| 11,719,792 B2 * | 8/2023 | Bennington ............ G01S 17/89 356/4.01 |
| 2015/0346344 A1 | 12/2015 | Gilliland et al. |
| 2017/0122804 A1 | 5/2017 | Cao et al. |
| 2017/0234976 A1 | 8/2017 | Grauer et al. |
| 2018/0231645 A1 | 8/2018 | Droz et al. |
| 2018/0259645 A1 | 9/2018 | Shu et al. |
| 2018/0284231 A1 | 10/2018 | Russell et al. |
| 2018/0284240 A1 | 10/2018 | LaChapelle et al. |
| 2019/0250256 A1 | 8/2019 | Gunnam et al. |
| 2019/0271767 A1 | 9/2019 | Keilaf et al. |
| 2022/0283269 A1 | 9/2022 | Stern |

OTHER PUBLICATIONS

International Search Report and Written Opinion of the International Searching Authority directed to related International Patent Application No. PCT/US2021/046993, mailed Dec. 14, 2021; 9 pages.

Wang et al. "LiDAR Ranging System Based on Automatic Gain Control and Timing Discriminators", School of Instrumentation & Opto-Electronic Engineering, Beihang University, May 2017, pp. 1-7, Beijing, China.

Zhu et al. "A Wide Dynamic Range Laser Rangefinder With CM-Level Resolution Based On AGC Amplifier Structure", Infrared Physics & Technology, Mar. 2012, pp. 210-215, vol. 55, issues 2-3, Department of Electronic Engineering, Tsinghua University, Beijing, China.

* cited by examiner

SYSTEMS AND METHODS FOR INTRA-SHOT DYNAMIC ADJUSTMENT OF LIDAR DETECTOR GAIN

CROSS-REFERENCE TO RELATED APPLICATIONS

This application is a Continuation of application Ser. No. 17/000,265 filed on Aug. 21, 2020, now U.S. Pat. No. 11,719,792 issued on Aug. 8, 2023, which is hereby expressly incorporated by reference into the present application.

BACKGROUND

In a conventional LIDAR system, the return power (for example, power of light reflected back towards the LIDAR system from an object in the environment) may vary considerably depending on range, reflectivity, angle of incidence, surface features, and other factors. In order to accurately image a wide variety of surfaces as found in uncontrolled environments (for example, outdoors) it may be desirable to construct a LIDAR system that can detect objects in of as wide of a reflectivity range as possible at as far a distance as possible without saturating the detector or rendering it insensitive to low-reflectivity surfaces. This may be difficult when attempting to range an object of very low intensity at a very short distance, as it may be difficult to differentiate a low-intensity return from an object in the environment from internal reflections from the LIDAR system itself. Conventional solutions to this problem may include using high-cost high dynamic range receivers, placing a minimum range limit that is often meters away from the sensor, rendering a not-inconsiderable swathe of sensing area blind to all returns, and using high-complexity signal processing to differentiate between internal reflections and returns from surfaces external to the sensor, which may increase the processing requirements and may still be prone to uncertainty.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems and methods for intra-shot dynamic adjustment of LIDAR detector gain. In some embodiments, the systems and methods described herein may more particularly relate to dynamically adjusting the gain of a photodetector in an optical ranging system in order to vary the sensitivity of the photodetector to return light based on the amount of time that has passed since a corresponding light pulse was emitted from the optical ranging system (and based on the distance that the emitted light pulse has traveled from the optical ranging system). In some instances, the optical ranging system may be a LIDAR system (for simplicity, reference may be made hereinafter to a LIDAR system, but other optical ranging systems could be similarly applicable). In some instances, the photodetector may be an Avalanche Photodiode (APD), and may more specifically be an APD that operates in Geiger Mode (however, other types of photodetectors may also be used). This dynamic gain adjustment may be performed in order to detect objects of as wide of a reflectivity range as possible at as far a distance as possible without saturating the receiver or rendering it insensitive to low-reflectivity surfaces. Using such a dynamic gain to detect objects of as wide of a reflectivity range as possible may allow the LIDAR system to more accurately image a wide variety of surfaces as found in uncontrolled environments (for example, outdoors). One example of a conventional practice for addressing the aforementioned may involve changing the gain of the photodetector on a per-shot basis (for example, per light pulse emitted from the emitter device). This, however, may result in some percentage of return light being be outside the useful representation range of the detector, with "low gain" shots (for example, light pulses that are accompanied by a lower bias voltage being applied to the detector to result in a lower gain of the photodetector) potentially resulting in the photodetector unable to see return light from non-reflective objects in the environment, and "high gain" shots (for example, light pulses that are accompanied by a higher bias voltage being applied to the detector to result in a higher gain of the photodetector) saturating the photodetector. A photodetector being unable to "see" a non-reflective object may be indicative of the fact that non-reflective objects may reflect little to none of the emitted light back to the LIDAR system. As a result of this, little to no photons will reach the photodetector. Any photons that are able to reach the photodetector may be indistinguishable from mere environmental noise (for example stray photons that are detected by the photodetector that do not originate from the LIDAR system), and thus the non-reflective object may be effectively invisible to the photodetector during the low gain shots. Another conventional practice builds on this previous conventional practice by producing a high-dynamic-range detector by combining "high" and "low" gain shots and interspersing them throughout a LiDAR sweep. This, however, may result in many shots that contain limited or no information. Another alternative conventional solution to this may involve using a detector with native high dynamic range, but this conventional solution may entail great cost and complexity, as the noise floor of the detector may need to be extremely low for the photodetector to be useful.

Given these downfalls to some of the conventional approaches to addressing the phenomenon that return light power varies depending on range, the systems and methods described herein may provide solutions to dynamically adjust the detector sensitivity as emitted light from the LIDAR system travels further from the LIDAR system. These adjustments may be performed based on a user-defined function. In some embodiments, the gain of the photodetector may be dynamically adjusted by adjusting the bias voltage applied to the photodetector (the gain of the photodetector may be a function of the bias voltage applied to the photodetector). The dynamic application of the bias voltage may be performed using a number of different methods. One example may include using a high-speed digital to analog converter (DAC) to produce a continuous gain waveform. A second example may include an analog multiplexor with two or more voltage selections for a discrete level gain waveform. These two examples should not be taken as limiting, and any number of additional methods for dynamically changing the applied bias voltage may also be used.

In some embodiments, the dynamic adjustment of the photodetector gain (for example via the applied bias voltage) may begin with setting the bias voltage at or below a threshold value for a time frame in between emitting a light pulse from the emitting device (for example laser diode) and the light pulse exiting the interior of the LIDAR system and entering the environment. Setting the bias voltage of the photodetector to be at or below this threshold value may result in the photodetector operating in a linear mode (for example with a linear gain). This may be in contrast to operation of a photodetector in Geiger Mode, for example, which may involve the photodetector operating at a much higher gain (for example on the order of $10^5$ or $10^6$). For example, the bias voltage may be reduced to 20V or lower. A linear-mode photodiode may respond to incident light by allowing an amount of current proportional to an intensity of the incident light intensity to flow as determined by a gain function. A photodiode in Geiger mode may instead avalanche with incident light and continue to pass current until quenched (that is, until it's applied bias voltage is lowered to below the photodiode's breakdown voltage). Operation of the photodetector in linear mode may result in the photodetector being insufficiently sensitive to achieve long-range detection using eye-safe photonic sources (for example sources that may be used in autonomous vehicle systems, such as the emitting device 102, emitter 402, and/or any other emitting device, emitter, and the like described herein). This may be because it may take many photons to achieve a signal that is higher than the noise floor of the system when the photodiode is operating in linear mode, whereas a Geiger-mode photodiode may be set to avalanche upon the incident of a single photon, and the amplitude of its response may be independent of the number of photons that have struck it. This operation of the photodetector in linear mode during this particular time frame may serve to prevent return photons that may have been reflected internally to the LIDAR system back towards the photodetector from being recognized as signals indicative of returns from objects in the environment. As described above, such returns may be difficult to distinguish from returns that originate from low-reflective objects close to the LIDAR system. Thus, these internal reflections may result in undesirable information for the LIDAR system.

In some embodiments, subsequent to the emitted light exiting the LIDAR system, the gain of the photodetector may be increased to allow the photodetector to detect when the emitted light reflects from objects in the environment and back towards the LIDAR system. In some instances, the gain of the receiver may be increased based on a user-defined function (example functions may be depicted in FIGS. 1B-1C). The function may define what the bias voltage of the photodetector should be set to at any given time in the timeframe between the emitted light entering the environment and traversing towards the maximum detecting range of the photodetector. For example, the bias voltage applied to the photodetector may be dynamically adjusted over time instead of simply being increased to a maximum value immediately following the emitted light entering the environment. As a first example, the bias voltage may be steadily increased as the time since the emitted light exited the LIDAR system also increases (up until a time at which any return light received by the photodetector may originate from a maximum detection range of the LIDAR system, and the bias voltage detector may be brought to or below the threshold again as described above). As a second example, the bias voltage may be increased to a maximum value at a time at which return light received by the photodetector may originate before the maximum range, and then may be decreased. That is, the bias voltage may be increased to a maximum value corresponding to a time at which return light from the environment may originate from a particular region of interest in the environment. For example, it may be desirable to ensure that the detector is more sensitive to particular regions in the environment of the LIDAR system for a number of reasons. As a few non-limiting examples, there may be a known object of interest in the region or it may not be known if objects are in the region, but it may be desired to determine if objects do exist. As a third example, the gain may be altered based on external factors. For example, one external factor may include the ambient light of the LIDAR system (for example the gain may be minimized when the ambient light is greater during a bright day). Additional examples may include weak returns from dust or rain in the air, or secondary returns from windows, or extreme temperatures causing spontaneous avalanches of the photodetector. The above examples are not intended to be limiting, and the gain of the photodetector may be dynamically adjusted based on any other form of user-defined function as well.

In some embodiments, in addition to reducing the bias voltage of the photodetector to or below the threshold value while the emitted light is traversing the interior of the LIDAR system, the bias voltage may also be reduced to or below the threshold value at a second time. This second time may include a time at which return light from the environment may correspond to light that is returning from a maximum detecting range of the photodetector. That is, if the maximum detecting range of the photodetector is known, it may be possible to determine when light reflecting from that maximum distance may return to the LIDAR system and be detected by a photodetector (for example, given that the speed of light is known). The maximum range of the photodetector, for example, may be a factor of the rate at which the emitting device is emitting subsequent light pulses, but also may depend on other factors as well. An example of a maximum range may be 320 meters, but any other maximum range may also be possible. The purpose of also effectively blinding the photodetector at the maximum detecting range of the LIDAR system may be to prevent range aliasing. Range aliasing may be a phenomenon where light returns beyond the maximum range are detected as if they were within the range of the LIDAR system (for example, the light may be incorrectly identified as return light from a subsequent light pulse emitted from the LIDAR system). This may lead to inaccurate range information regarding objects in the environment of the LIDAR system. Thus, for each emitted beam of light it may be desirable to ensure that the detector may only be detecting return light within the maximum range window of the LIDAR system. In some instances, the bias voltage of the photodetector may also be reduced to or below the threshold value at other times not described herein. For example, operation of a photodiode in linear mode may be useful in situations when a photodiode in avalanche mode is spontaneously avalanching at too great a rate to be useful, and the signal power of the return is high enough to warrant linear mode. For example, this may be the case in a scenario where a clean data with a single scan of the environment at close range may be required.

In some embodiments, the above-mentioned function may be user-defined and may either be fixed or may change with successive shots (a "shot" may refer to a pulse of light emitted by the LIDAR system). A fixed function may involve the same function being used for each successive light pulse that is emitted from the LIDAR system (for example each successive shot). That is, the gain may increase and or decrease in the same manner at the same times with each successive light pulse. However, in some embodiments, the function may also be varied among some or all of the successive shots. For example, a first function may be used for a first shot, and a second function that is different than the first function may be used for a second shot. The use of different functions, for example, may be a useful way to increase dynamic range of the LIDAR system. That is, one shot may pick up bright objects in the environment, and the second may be used to identify dim objects in the environment. The sensitive shot can hide high-reflective objects in the responses of the dim objects, since the photodiode may not have recovered in time to respond to the highly reflective objects. By sweeping a single scan through various gains, as many returns as possible may be gathered, not just the strongest or the closest or the ones far enough apart that the photodiode has time to recover.

In some embodiments, the systems and methods described herein may be implemented as an open-loop system. That is, the detector gain function may be fixed as described above and the dynamic gain adjustment of the photodetector may be iteratively performed in the same manner upon every laser firing of the LIDAR system. In some embodiments, however, the systems and methods described herein may also be implemented as a closed-loop system. That is, the detector gain function may be altered based on information received back from the environment, such as timing information with respect to the timing of return light reflected from objects in the environment. As one example, the gain of the detector may be altered to peak at a particular time where it is determined from previous returns that an objects may exist in the environment. This alteration in the gain function may be performed so that more information can be obtained about this identified object, rather than maximizing the gain where it may have been determined previously that objects are not present. However, the gain may be altered in any number of other manners based on any other number of criteria as well. For example, monitoring the response of the system in real-time may make it possible to adjust the gain in the middle of a shot based on a determined noise floor level (ambient light). This may also be used as a form of active quenching, rapidly drawing down the applied bias voltage after an avalanche and reconstituting it in order to increase the response rate of the photodiode.

Figure 1A:
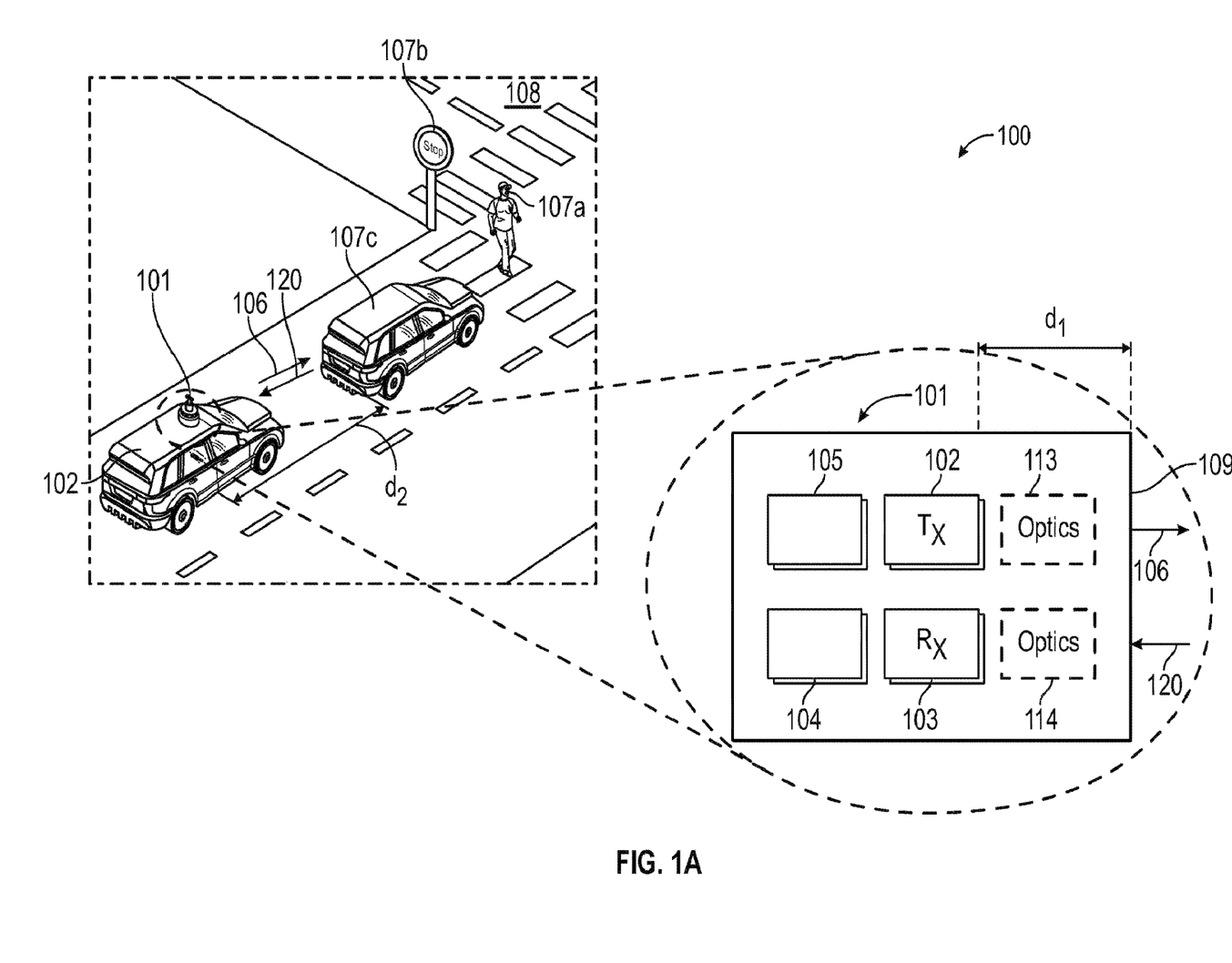
FIG. 1A depicts an example process, in accordance with one or more example embodiments of the disclosure.

With reference to the figures, FIG. 1A includes a schematic diagram of an example process 100 for an exemplary LIDAR system 101 that may employ dynamic photodetector gain adjustments as described above. With reference to the elements depicted in the process 100, the LIDAR system 101 may include at least one or more emitting devices 102, one or more detector devices 103, one or more circuits 104, and/or one or more controllers 105. The LIDAR system 101 may also optionally include one or more emitter-side optical elements 113 (for example, which may be the same as optical element(s) 404 as described with respect to FIG. 4) and/or one or more receiver-side optical elements 114 (for example, which may be the same as optical element(s) 408 as described with respect to FIG. 4). Additionally, external to the LIDAR system 101 may be an environment 108 that may include one or more objects (for example object 107a and/or object 107b). Hereinafter, reference may be made to elements such as "emitting device," "detector device," "circuit," "controller," and/or "object," however such references may similarly apply to multiple of such elements as well.

In some embodiments, an emitting device 102 may be a laser diode for emitting a light pulse (for example, the emitter 402 as described below with reference to FIG. 4). A detector device 103 may be a photodetector (for example, the detector 406 as described below with reference to FIG. 4), such as an Avalanche Photodiode (APD), or more specifically an APD that may operate in Geiger Mode (however any other type of photodetector may be used as well). It should be noted that the terms "photodetector" and "detector device" may be used interchangeably herein. A circuit 104 may be circuitry connected to the detector device 103 that may be used to dynamically alter the gain of the detector device 103 by applying varying bias voltages to the detector device 103. The gain of the detector device 103 may be based on the bias voltage that is applied to the detector device 103. The circuit 104 may be described in more detail in FIGS. 2A-2C below. The controller 105 may be a computing system (for example, the computing portion 413 described below with respect to FIG. 4) that may be used to control any of the operations described with respect to process 100. For example, the controller 105 may be a part of a closed-loop system in which the gain set by the circuit 104 may be adjusted based on return light from the environment 108. However, in some instances the LIDAR system 101 may be an open-loop system and the circuit 104 may alternatively adjust the gain of the photodetector 103 based on a fixed, user-defined function, and the circuit 104 may function without the use of the controller 105. Finally, an object 107a and/or 107b may be any object that may be found in the environment 108 of the LIDAR system 101 (for example, object 107a may be a vehicle and object 107b may be a pedestrian, but any other number or type of objects may be present in the environment 108 as well).

In some embodiments, the steps of the process 100 may proceed as follows. The process 100 may begin with an emitting device 102 emitting a light pulse 106. The light pulse 106 may not immediately exit the LIDAR system 101 and enter the environment 108, but may instead traverse the interior of the LIDAR system 101, which may be shown as distance di in the figure. That is, the light pulse 106 may travel distance di from the emitting device 102 to an interface 109 between the interior portion of the LIDAR system 101 and the environment 108. As described above, while light is traversing the interior of the LIDAR system 101, it may be possible for some of the light pulse 106 to internally reflect. That is, the light pulse 106 may reflect from elements internal to the LIDAR system 101 and/or at the interface 109 back towards the detector device 103. To mitigate or prevent the photodetector 103 from registering such internal reflections, the detector device 103 may be effectively blinded for a period during which any portion of the light pulse 106 might be traversing up to the distance di and then back to the detector device 103 As described above, it may be undesirable for the detector device 103 to register these internal reflections because they may be difficult to distinguish from return reflections originating from low-reflectivity objects that are in the environment 108 (external to the LIDAR system) in close proximity to the LIDAR system 101. Blinding the detector device 103 may include lowering a bias voltage of the detector device 103 to be at or below a lower threshold voltage value. For example, the lower threshold voltage value may be 20V, but any other voltage may similarly be applicable. Lowering the bias voltage of the detector device 103 to at or below this lower threshold voltage value may place the detector device 103 in a linear mode of operation in which the gain of the detector device 103 is linear. A linear-mode photodiode may respond to incident light by allowing an amount of current proportional to an intensity of the incident light intensity to flow, as determined a gain function. A photodiode in Geiger mode may instead avalanche with incident light and continue to pass current until quenched (that is, until it's applied bias voltage is lowered to below the photodiode's breakdown voltage). Operation of the detector device 103 in linear mode may result in the detector device 103 being insufficiently sensitive to achieve long-range detection using eye-safe photonic sources (for example sources that may be used in autonomous vehicle systems, such as the emitting device 102, emitter 402, and/or any other emitting device, emitter, and the like described herein). This may be because it may take many photons to achieve a signal that is higher than the noise floor of the system when the photodiode is operating in linear mode, whereas a Geiger-mode photodiode can be set to avalanche upon the incident of a single photon, and the amplitude of its response may be independent of the number of photons that have struck it.

In some embodiments, subsequent to the light pulse 106 reaching the interface 109 of the interior portion of the LIDAR system 101 and entering into the environment 108 (for example, corresponding to a time after which any return light reflected internal with the LIDAR system 101 would be received by the photodetector 103), the bias voltage applied to the detector device 103 may again be increased above the lower threshold voltage value. This may correspondingly increase the gain of the detector device 103 such that the detector device 103 may be capable of detecting an amount of return photons from the environment 108 that is distinguishable from merely environmental noise. For example, the bias voltage may be increased above the 20V threshold. Additionally, as the light pulse 106 traverses through the environment 108, the gain of the photodetector 103 may be increased or decreased (through a corresponding increase or decrease in the bias voltage applied to the detector device 103) over time based on a user-defined function. As one non-limiting example, a user-defined function may look similar to the function 152 depicted in FIG. 1B.

Figure 1B:
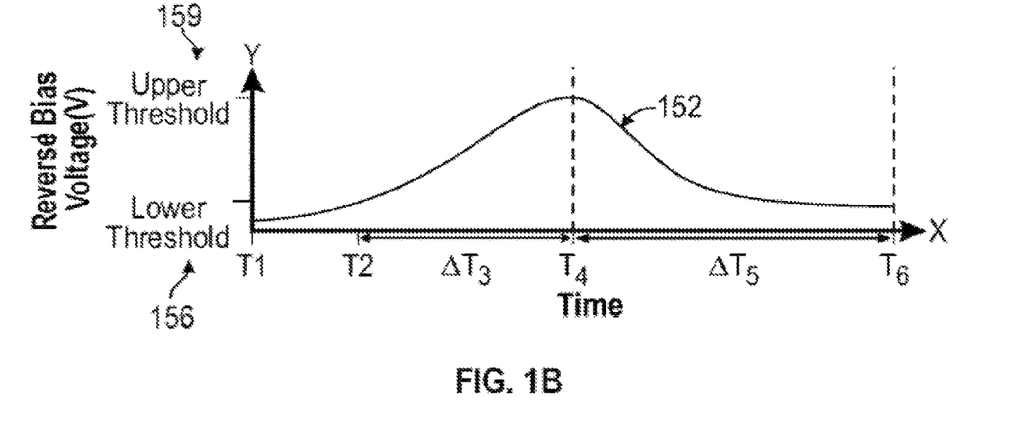
FIGS. 1B-1C depict example user-defined functions, in accordance with one or more example embodiments of the disclosure.
Figure 1C:
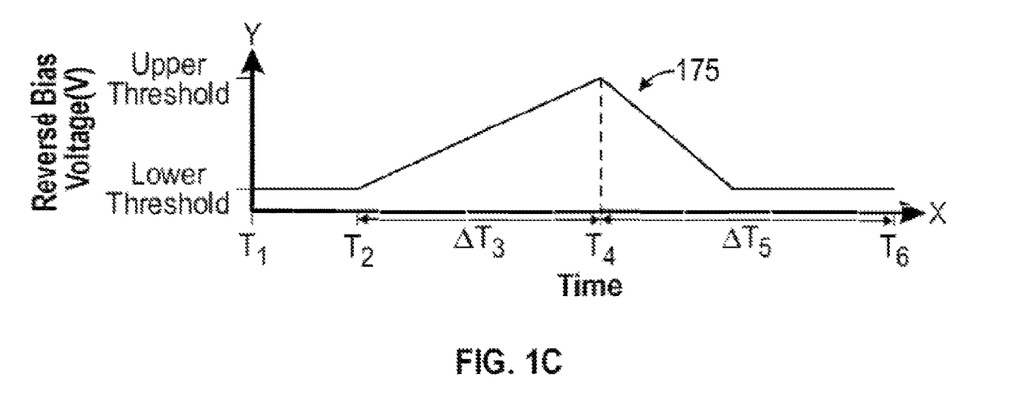

In FIG. 1B, the x-axis may represent time, and the y-axis may represent a bias voltage that may be applied by the circuit 104 to the photodetector 103 at the corresponding times on the x-axis (for example $T_2$, $\Delta T_3$, $T_4$, $\Delta T_5$ and $T_6$). The gain of the detector device 103 may be based on the bias voltage, so the portions of the function where the applied bias voltage is increasing may correspond to an increase in the gain of the detector device 103. The function 152 may include a lower threshold value 156 (for example which may be the same as the lower threshold voltage value) and an upper threshold value 159, which may be a maximum bias voltage applied to the photodetector 103. As depicted in FIG. 1B, the function 152 may begin at time $T_1$ when the light pulse 106 is emitted from the emitting device 102. As shown in the function 152, the bias voltage applied to the photodetector 103 may be at or below the lower threshold value 156 until time $T_2$. Time $T_2$ may correspond to a time at (or after) which light that has reached the interface 109 of the LIDAR system 101 would be received at the photodetector 103 (for example, reflected from the interface 109 back to the photodetector 103). Subsequent to this time, $T_2$, the bias voltage applied to the photodetector 103 may start to increase as shown by the increase in the function 152. The function 152 may continue to increase over the time period $\Delta T_3$ (which may represent a portion of a time period during which return light received at the photodetector 103 may originate from the light pulse 106 traversing the environment 108) towards the upper threshold value 159. The example function 152 may eventually peak at the upper threshold value 159 at time $T_4$, which may correspond to a time that corresponds to the photodetector 103 receiving return light that may originate from the light pulse 106 reflecting from an object of interest in the environment 108. For example, as depicted in FIG. 1A, the object of interest may be the vehicle 107c. In some instances, the function 152 may have been intentionally defined by a user to include a peak at this time so that the gain of the photodetector 103 may be highest when it is likely that the light pulse 106 will be received by the photodetector 103 subsequent to reflecting from the object of interest 107c in the environment 108. For example, such a peak may be chosen so that the photodetector 103 is most sensitive to return light from the particular region of interest designated by a user or the LIDAR system 101. This may allow the LIDAR system 101 to capture the most amount of information from this region of interest relative to other areas of the environment 108. Subsequent to this peak of the function 152, the bias voltage may be depicted as decreasing over a period of time, $\Delta T_5$. The period of time $\Delta T_5$ may include return light pulses being received at the photodetector 103 that may originate from the light pulse 106 traversing the environment 108 beyond the object of interest 107c. Ultimately, the light pulse 106 may reach the maximum range of the photodetector. As described above, the bias voltage of the photodetector 103 may again be dropped to at or below the lower threshold value 156 at a time $T_6$ (which may correspond to a time at which any return light received by the photodetector 106 may originate from a light pulse 106 reflecting from an object at the maximum range of the photodetector 103. in order to avoid range aliasing. This process 100 may then be repeated iteratively using either the same function 152 (for example in an open loop system), or a varying function (for example in a closed-loop system). Furthermore, it should be noted that while FIG. 1B provides an example of a user-defined function 152 that may be used to adjust the gain of the photodetector 103, any other type of function could similarly be used to increase and/or decrease the gain of the photodetector 103 at varying levels and at varying times. For example, the function may steadily increase until the maximum detection range of the detector device 103, at which point the bias voltage may be dropped to below the lower threshold bias voltage. Another example user-defined function 175 is shown in FIG. 1C, which depicts a square wave user-defined function 175 that transitions between the lower threshold and upper threshold instantaneously at various times. Again, this user-defined function 175 depicted in FIG. 1C is merely another exemplification of a user-defined function, and any other type of user-defined function may be applicable as well.

Illustrative Control Circuitry

Figure 2A:
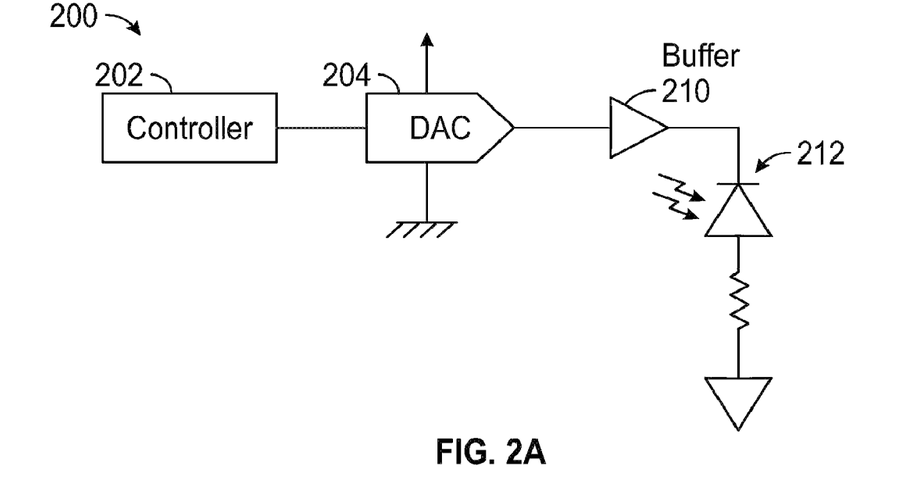
FIGS. 2A-2C depict exemplary circuitry, in accordance with one or more example embodiments of the disclosure.
Figure 2B:
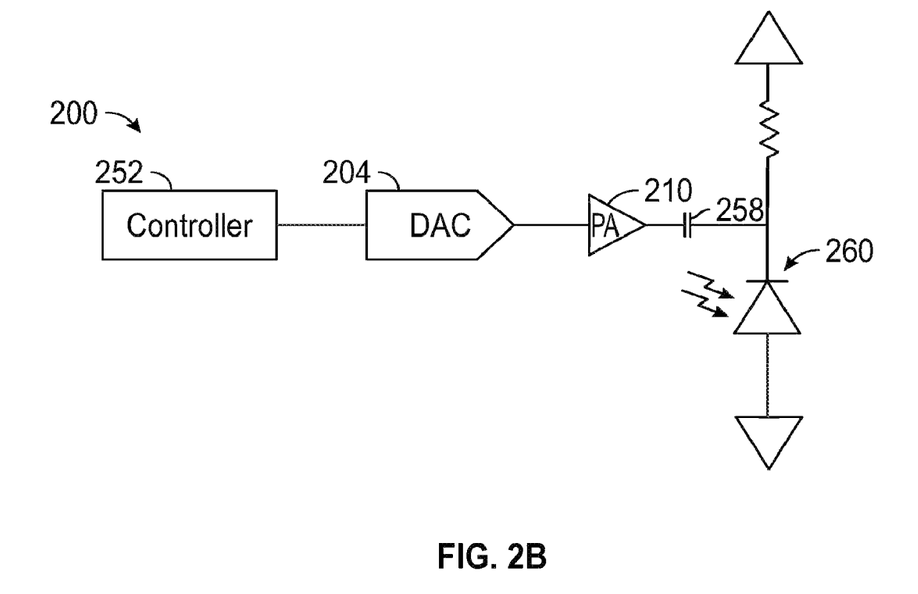
Figure 2C:
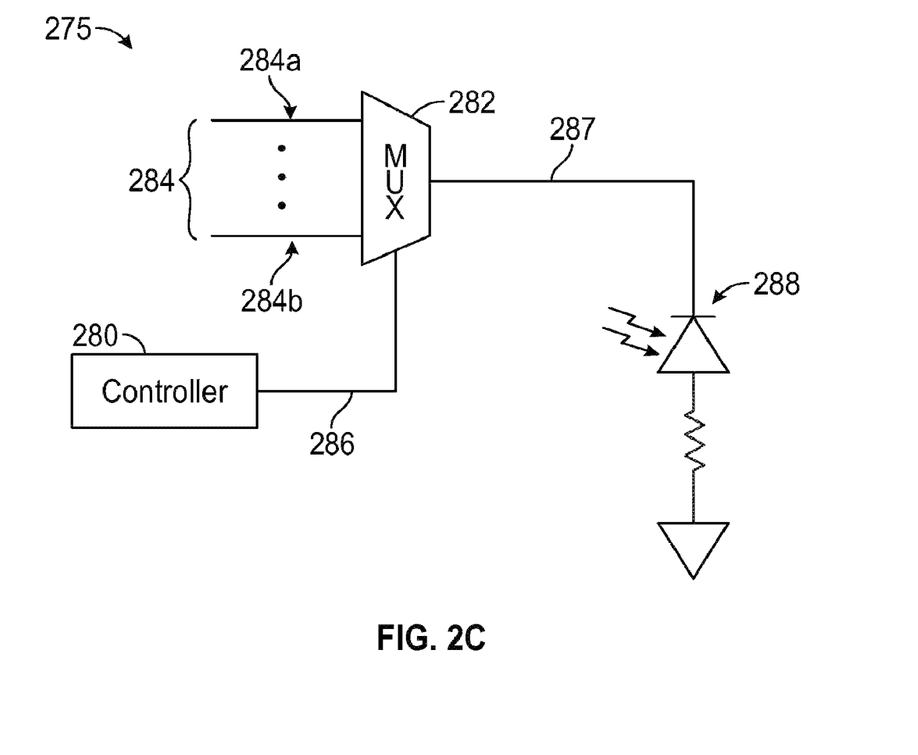

FIGS. 2A-2C depict exemplary circuits that may be used to adjust a bias voltage applied to a photodetector (for example, photodetector 103 described with respect to FIG. 1A, as well as any other photodetector or detecting device as described herein). That is, the exemplary circuits may be used to perform the gain adjustments described herein (for example, at least with respect to FIGS. 1A and 1B). FIG. 2A may depict a first example circuit 200. The first example circuit 200 may include at least a controller 202, a digital to analog converter (DAC) 204, a buffer 210, and/or a photodetector 212. In some embodiments, the controller 200 may be the same as controller 105 described with respect to FIG. 1A and/or computing portion 413 described with respect to FIG. 4. The controller 202 be used to generate an output signal used to control the bias voltage of the photodetector 212. For example, the controller 202 may store information about a user-defined function (for example, the user defined function described with respect to FIG. 1B, as well as any other user-defined function described herein) that may be used to control the bias voltage applied to the photodetector 212. The controller 202 may use this function to determine what signal to output that will result in the appropriate bias voltage being applied to the photodetector 212 based on an amount of time that has passed since a light pulse was emitted from an emitting device of the LIDAR system. The signal output may be a digital output signal and may be transmitted to the DAC 204. The DAC 204 may receive the digital signal and may convert the digital output signal to an analog signal that may then be provided to the photodetector 212 to adjust the bias voltage of the photodetector 212. Before reaching the photodetector 212, the analog output signal of the DAC 204 may also pass through a buffer 210. In some embodiments, the buffer 210 may be included because the first example circuit 200 may have to contend with the fact that the DAC 204 may not produce sufficient power to drive a load directly. The buffer 210 may thus take the voltage provided by the DAC 204 and output the same voltage with significantly higher current driving capabilities.

FIG. 2B may depict a second example circuit 250. Similar to the first example circuit 200, the second example circuit 250 may also include a controller 252, DAC 254, and a photodiode 260. However, the second example circuit 250 may differ from the first example circuit 200 in that it may also include a power amplifier (PA) 256 instead of a buffer 210. This second example circuit 250 may be faster in its response and also may pass AC voltages instead of DC voltages. In the second example circuit 250, the photodiode may be powered by a 'nominal' bias voltage (the nominal bias voltage may be a bias voltage that the photodiode 260 may primarily operate at as a baseline, for example), and the DAC 254 and PA 256 may provide 'additive' voltages to that nominal bias voltage in an AC sense via capacitive coupling 258. Under normal circumstances, the bias voltage may be at nominal, but when the DAC 254 and PA 256 change their voltage rapidly, that rapid voltage change may cross the capacitive coupling 258 and drag the bias voltage seen by the photodiode 260 up or down momentarily. Some benefits of this may be that the DAC 254 and PA 256 may not have to swing enormous voltages, and instead may only have to swing the amount of voltage required to change the photodiode bias (or even just half of that based on the value of the nominal bias voltage). The amount of time the voltage is swung may be dictated by the frequency of the DAC 254 and/or PA 256 signal and the cutoff frequency of the capacitive coupling. However, the amount of time a changed voltage needs to be held may not be of particular concern because the second example circuit 250 may only need to hold charges based on emitted light traveling at the speed of light.

FIG. 2C may depict a third example circuit 275. As depicted in FIG. 2C, the third example circuit 275 may use a multiplexor 282 to produce a discrete level gain waveform. The multiplexor 282 may be used in place of a DAC (for example DAC 204 and/or DAC 254). Similar to FIGS. 2A-2B, the third example circuit 275 may include a controller 280 for producing output signals. However, in the third example circuit 275, the controller may send a signal to the multiplexor 282 through a selection input 286. The signal provided to the selection input 286 may indicate to the multiplexor 282, which one or more input lines 284 (for example input line 284a and/or input line 284b and/or any other number of input lines) to choose to provide as an output 287 to the photodiode 288.

Illustrative Methods

Figure 3:
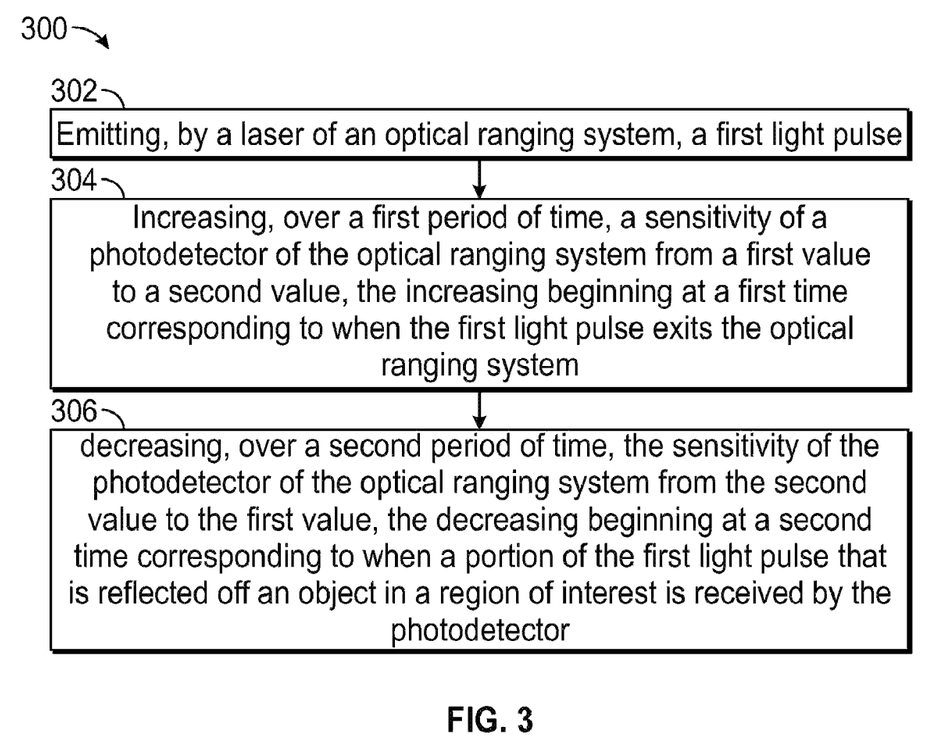
FIG. 3 depicts an example method, in accordance with one or more example embodiments of the disclosure.

FIG. 3 is an example method 300 for intra-shot dynamic adjustment of LIDAR detector gain in accordance with one or more example embodiments of the disclosure.

At block 302 of the method 300 in FIG. 3, the method may include emitting, by an optical ranging system at a first time, a first light pulse. The laser, for example, may be the same as the emitting device 102 described with respect to FIG. 1A, or any other emitting and/or emitter device described herein.

Block 304 of the method 300 may include increasing, after the first time, a sensitivity of a photodetector of the optical ranging system from a first sensitivity at the first time to a second sensitivity at a second time. In some embodiments, the gain of the photodetector may be increased by increasing the bias voltage that is applied to the photodetector. Increasing this bias voltage may take the photodetector out of its linear mode of operation (operating with a linear gain), which may effectively "unblind" the photodetector and allow it to register returning light from the environment.

In some instances, the gain of the receiver may be increased based on a particular function (an example of a function may be depicted in FIGS. 1B and 1C described above). The function may define what the gain should be set to at any given time in the timeframe between the emitted light entering the environment and traversing towards the maximum detecting range of the photodetector. This function may be user-defined and may either be fixed or may change with successive shots. For example, the gain of the detector may be dynamically altered over time instead of simply being increased to a maximum value immediately following the emitted light entering the environment. As a first example, the gain may be steadily increased as the time since the emitted light exited the LIDAR system also increases (up until the time at which the emitted light may reach the maximum detection range of the LIDAR system, and the gain detector may be brought below the threshold again as described above). As a second example, the gain may be increased to a maximum value at a point before the maximum range, and then may be decreased. That is, the gain may be increased to a maximum value at a particular region of interest. For example, it may be desirable to ensure that the detector is more sensitive to particular regions in the environment of the LIDAR system for a number of reasons. As a few non-limiting examples, there may be a known object of interest in the region or it may not be known if objects are in the region, but it may be desired to determine if objects do exist. As a third example, the gain may be altered based on external factors. For example, one external factor may include the ambient light of the LIDAR system (for example the gain may be minimized when the ambient light is greater during a bright day). The above examples are not intended to be limiting, and the gain of the photodetector may be dynamically adjusted based on any other form of user-defined function as well.

Block 306 of the method 300 may include decreasing the sensitivity of the photodetector of the optical ranging system from the second sensitivity at third time to the first sensitivity at a fourth time, wherein the fourth time is after the photodetector receives return light based on the first light pulse. In some embodiments, as described above, the gain of the photodetector may be reduced by reducing a bias voltage that is applied to the photodetector. The gain may be based on the bias voltage that is applied to the photodetector, so decreasing the bias voltage may result in a corresponding reduction in the gain of the photodetector. Setting the gain of the photodetector to be below this threshold value may result in the photodetector operating with a linear gain. This may be in contrast to operation of a photodetector in Geiger Mode, for example, which may involve the photodetector operating at a much higher gain. For example, the bias voltage may be reduced to 20V or lower. Operation of the photodetector in linear mode may effectively result in the photodetector being effectively "blind" to any returning light. The effective blinding of the photodetector during this particular time frame may serve to prevent the detector from detecting any return photons that may have been reflected internally to the LIDAR system. As described above, such returns may be difficult to distinguish from returns that originate from low-reflective objects close to the LIDAR system. Thus, these internal reflections may result in undesirable information for the LIDAR system.

An example of a specific type of region of interest for which dynamic gain adjustment may be performed may be a region that includes fog or exhaust gas from another vehicle. Return light from the region may be a very bright return, which may provide an indication that the region includes the fog or exhaust gas. Subsequently to detecting this very bright return, the gain of the photodetector may be decreased through that bright region and increased again once beyond the region. This may allow the photodetector to have increased sensitivity to what is immediately behind the bright object (behind the fog and/or exhaust gas). For example, example at five meters from the photodetector, there may be a region including steam coming out of an exhaust pipe and at six meters, there may be a person standing (behind steam from the perspective of the LIDAR system. The steam from the exhaust causes a very bright return and the photodetector may become saturated and thus unable to detect the person at six meters. Based on this, the gain may be decreased for return light originating from five meters away (where the steam is), and ramped back up at 5.5 meters or some distance beyond where the steam exists at five meters away.

In some embodiments, the reduction in bias voltage that is applied to the photodetector may be performed using a number of different methods. One example method may include using a high-speed digital to analog converter (DAC) to produce a continuous gain waveform. A second example method may include an analog multiplexor with two or more voltage selections for a discrete level gain waveform. Examples of circuitry that may be used for each of these methods may be described above with reference to FIGS. 2A-2C. Additionally, these two examples should not be taken as non-limiting, and any number of additional methods for dynamically changing the applied bias voltage may also be used.

Block 306 of the method 300 may include emitting, by the optical ranging system at the fourth time, a second light pulse. Thus, the sensitivity of the photodetector may be at the first sensitivity at the time the second light pulse is emitted. This may prevent the photodetector from detecting return light that is reflected from internal components of the LIDAR system, avalanching, and entering a recovery period when the emitted light exits the LIDAR system and enters the environment. This may prevent the photodetector from being effectively blind to short range reflections from objects in the environment, as the recovery period may last for up to tens of nanoseconds.

The operations described and depicted in the illustrative process flow of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Example Lidar System

Figure 4:
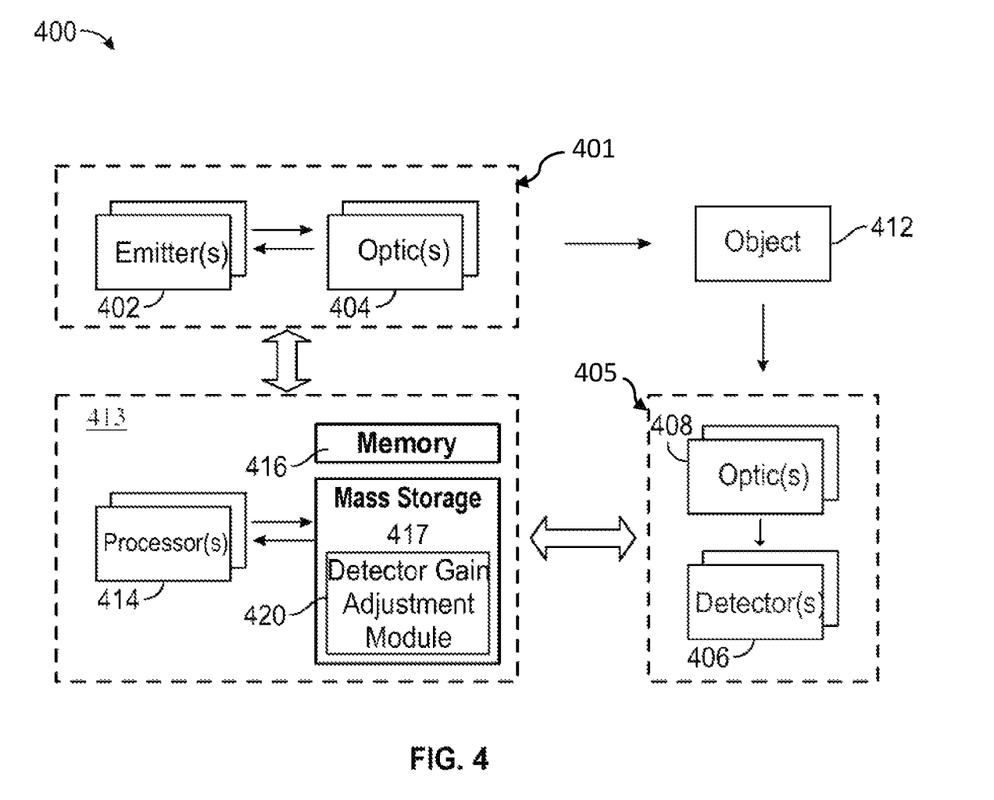
FIG. 4 depicts a schematic illustration of an example system architecture, in accordance with one or more example embodiments of the disclosure.

FIG. 4 illustrates an example LIDAR system 400, in accordance with one or more embodiments of this disclosure. The LIDAR system 400 may be representative of any number of elements described herein, such as the LIDAR system 100 described with respect to FIG. 1A, as well as any other LIDAR systems described herein. The LIDAR system 400 may include at least an emitter portion 401, a detector portion 405, and a computing portion 413.

In some embodiments, the emitter portion 401 may include at least one or more emitter(s) 402 (for simplicity, reference may be made hereinafter to "an emitter," but multiple emitters could be equally as applicable) and/or one or more optical element(s) 404. An emitter 402 may be a device that is capable of emitting light into the environment. Once the light is in the environment, it may travel towards an object 412. The light may then reflect from the object and return towards the LIDAR system 400 and be detected by the detector portion 405 of the LIDAR system 400 as may be described below. For example, the emitter 402 may be a laser diode as described above. The emitter 402 may be capable of emitting light in a continuous waveform or as a series of pulses. An optical element 404 may be an element that may be used to alter the light emitted from the emitter 402 before it enters the environment. For example, the optical element 404 may be a lens, a collimator, or a waveplate. In some instances, the lens may be used to focus the emitter light. The collimator may be used to collimate the emitted light. That is, the collimator may be used to reduce the divergence of the emitter light. The waveplate may be used to alter the polarization state of the emitted light. Any number or combination of different types of optical elements 404, including optical elements not listed herein, may be used in the LIDAR system 400.

In some embodiments, the detector portion 405 may include at least one or more detector(s) 406 (for simplicity, reference may be made hereinafter to "a detector," but multiple detectors could be equally as applicable) and/or one or more optical elements 408. The detector may be a device that is capable of detecting return light from the environment (for example light that has been emitted by the LIDAR system 400 and reflected by an object 412). For example, the detectors may be photodiodes. The photodiodes may specifically include Avalanche Photodiodes (APDs), which in some instances may operate in Geiger Mode. However, any other type of photodetector may also be used. The functionality of the detector 406 in capturing return light from the environment may serve to allow the LIDAR system 100 to ascertain information about the object 412 in the environment. That is, the LIDAR system 100 may be able to determine information such as the distance of the object from the LIDAR system 100 and the shape and/or size of the object 412, among other information. The optical element 408 may be an element that is used to alter the return light traveling towards the detector 406. For example, the optical element 408 may be a lens, a waveplate, or filter such as a bandpass filter. In some instances, the lens may be used to focus return light on the detector 406. The waveplate may be used to alter the polarization state of the return light. The filter may be used to only allow certain wavelengths of light to reach the detector (for example a wavelength of light emitted by the emitter 402). Any number or combination of different types of optical elements 408, including optical elements not listed herein, may be used in the LIDAR system 400.

In some embodiments, the computing portion may include one or more processor(s) 414 and memory 416. The processor 414 may execute instructions that are stored in one or more memory devices (referred to as memory 416). The instructions can be, for instance, instructions for implementing functionality described as being carried out by one or more modules and systems disclosed above or instructions for implementing one or more of the methods disclosed above. The processor(s) 414 can be embodied in, for example, a CPU, multiple CPUs, a GPU, multiple GPUs, a TPU, multiple TPUs, a multi-core processor, a combination thereof, and the like. In some embodiments, the processor(s) 414 can be arranged in a single processing device. In other embodiments, the processor(s) 414 can be distributed across two or more processing devices (for example multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (for example manufactured) to perform the functions described herein.

The processor(s) 414 can access the memory 416 by means of a communication architecture (for example a system bus). The communication architecture may be suitable for the particular arrangement (localized or distributed) and type of the processor(s) 414. In some embodiments, the communication architecture 406 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 416 also can retain data.

Each computing device 400 also can include mass storage 417 that is accessible by the processor(s) 414 by means of the communication architecture 406. The mass storage 417 can include machine-accessible instructions (for example computer-readable instructions and/or computer-executable instructions). In some embodiments, the machine-accessible instructions may be encoded in the mass storage 417 and can be arranged in components that can be built (for example linked and compiled) and retained in computer-executable form in the mass storage 417 or in one or more other machine-accessible non-transitory storage media included in the computing device 400. Such components can embody, or can constitute, one or many of the various modules disclosed herein. Such modules are illustrated as detector gain adjustment module 420.

The detector gain adjustment module 420 including computer-executable instructions, code, or the like that responsive to execution by one or more of the processor(s) 414 may perform functions including adjusting the gain of the detector 406 as described herein. For example, the gain adjustment module 420 may be used to provide a signal to change the bias voltage applied to the detector 406 as described herein. Additionally, the functions may include execution of any other methods and/or processes described herein.

It should further be appreciated that the LIDAR system 400 may include alternate and/or additional hardware, software, or firmware components beyond those described or depicted without departing from the scope of the disclosure. More particularly, it should be appreciated that software, firmware, or hardware components depicted as forming part of the computing device 400 are merely illustrative and that some components may not be present or additional components may be provided in various embodiments. While various illustrative program modules have been depicted and described as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

That which is claimed is:

1. A method comprising:
   emitting, by an emitting device of an optical ranging system at a first time, a first light pulse;
   increasing, after the first time, a sensitivity of a photodetector of the optical ranging system from a first sensitivity to a second sensitivity;
   decreasing the sensitivity of the photodetector of the optical ranging system from the second sensitivity to the first sensitivity after the photodetector receives a return light based on the first light pulse; and
   emitting, by the optical ranging system a second light pulse after decreasing the sensitivity of the photodetector of the optical ranging system to the first sensitivity.

2. The method of claim 1, wherein the photodetector is blind to return light at and below the first sensitivity.

3. The method of claim 1, wherein the photodetector detects the return light beyond the first sensitivity.

4. The method of claim 1, wherein the second sensitivity is reached at a time when the return light is detected by the photodetector, and wherein the return light is originated from a region of interest in an environment.

5. The method of claim 1, wherein increasing the sensitivity of the photodetector is based on an amount of ambient light in an environment.

6. The method of claim 1, wherein return light is originated from a maximum detection distance of the optical ranging system.

7. The method of claim 1, wherein decreasing the sensitivity of the photodetector is performed using at least one of a high-speed digital-to-analog converter or a multiplexor with two or more voltage selections for a discrete level sensitivity waveform.

8. The method of claim 1, wherein the photodetector is an avalanche photodiode.

* * * * *